(12) United States Patent
Lauermaa

(10) Patent No.: US 10,166,547 B2
(45) Date of Patent: Jan. 1, 2019

(54) LIFTER BAR, METHOD FOR MAKING A LIFTER BAR, METHOD FOR ASSEMBLING A LIFTER BAR AND A GRINDING MILL

(71) Applicant: OUTOTEC (FINLAND) OY, Espoo (FI)

(72) Inventor: Kari Lauermaa, Jyväskylä (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/517,696

(22) PCT Filed: Oct. 12, 2015

(86) PCT No.: PCT/FI2015/050685
§ 371 (c)(1),
(2) Date: Apr. 7, 2017

(87) PCT Pub. No.: WO2016/059294
PCT Pub. Date: Apr. 21, 2016

(65) Prior Publication Data
US 2017/0304836 A1 Oct. 26, 2017

(30) Foreign Application Priority Data

Oct. 14, 2014 (FI) ...................................... 20145901

(51) Int. Cl.
*B02C 17/00* (2006.01)
*B02C 17/18* (2006.01)
(Continued)

(52) U.S. Cl.
CPC ........ *B02C 17/1825* (2013.01); *B02C 17/225* (2013.01); *B29C 41/003* (2013.01); *B29C 41/38* (2013.01); *B29C 41/52* (2013.01)

(58) Field of Classification Search
CPC ....... B02C 17/02; B02C 17/002; B02C 17/04; B02C 17/1825; B02C 17/225
(Continued)

(56) References Cited

U.S. PATENT DOCUMENTS 3,295,772 A * 1/1967 Cunningham .......... B02C 17/18
241/182
3,783,918 A * 1/1974 Simpson ................. B27L 1/025
144/208.9

(Continued)

FOREIGN PATENT DOCUMENTS

FR           2 615 412 A1    11/1988

OTHER PUBLICATIONS

International Search Report issued by the European Patent Office in relation to International Patent Application No. PCT/FI2015/050685 dated Jan. 22, 2016 (3 pages).

(Continued)

*Primary Examiner* — Faye Francis
(74) *Attorney, Agent, or Firm* — Robert P. Michal, Esq.; Carter, DeLuca, Farrell & Schmidt, LLP

(57) ABSTRACT

A lifter bar, method for making a lifter bar, a method for assembling a lifter bar and a grinding mill for ore grinding is provided. The lifter bar includes a lifter bar body having an outer surface conforming to the outer surface of the lifter bar and a fixing element for connecting the lifter bar to the shell of the grinding mill. The lifter bar body further includes a first portion and a second portion forming a continuous lifter bar body. The fixing element is embedded in the first portion such that it forms part of the fixing surface of the lifter bar. The second portion is made of polyurethane and forms 35-85% of the volume of the lifter bar.

20 Claims, 3 Drawing Sheets

(51) Int. Cl.
  *B02C 17/22* (2006.01)
  *B29C 41/00* (2006.01)
  *B29C 41/38* (2006.01)
  *B29C 41/52* (2006.01)

(58) Field of Classification Search
  USPC ........................................ 241/182, 183, 300
  See application file for complete search history.

(56) References Cited

U.S. PATENT DOCUMENTS

| | | | | |
|---|---|---|---|---|
| 4,446,192 A * | 5/1984 | Dehlen | ................. | B02C 17/225 |
| | | | | 241/183 |
| 4,580,734 A * | 4/1986 | Eroskey | ................. | B02C 17/225 |
| | | | | 241/182 |
| 4,848,681 A | 7/1989 | Eriksson et al. | | |
| 5,431,351 A * | 7/1995 | Lejonklou | ............. | B02C 17/225 |
| | | | | 241/183 |
| 5,472,148 A * | 12/1995 | Schaeffer | ............. | B02C 17/225 |
| | | | | 241/183 |
| 5,752,665 A * | 5/1998 | Wason | .................. | B02C 17/225 |
| | | | | 241/183 |
| 6,189,280 B1 * | 2/2001 | Malmberg | ............ | B02C 17/225 |
| | | | | 241/183 |
| 8,136,649 B2 * | 3/2012 | Burstrom | ............. | B65G 11/166 |
| | | | | 193/2 R |
| 8,152,086 B2 * | 4/2012 | Moller | .................. | B02C 17/225 |
| | | | | 241/183 |
| 8,235,318 B2 * | 8/2012 | Timm | ................... | B02C 17/225 |
| | | | | 241/183 |
| 9,475,058 B2 * | 10/2016 | Town | .................... | B02C 17/225 |
| 2003/0062372 A1 * | 4/2003 | Malmberg | ........... | B65D 90/041 |
| | | | | 220/500 |
| 2008/0317992 A1 * | 12/2008 | Malmberg | ........... | B02C 17/225 |
| | | | | 428/44 |
| 2009/0173595 A1 * | 7/2009 | Burstrom | ............. | B02C 17/225 |
| | | | | 193/25 E |
| 2010/0127109 A1 * | 5/2010 | Moller | .................. | B02C 17/225 |
| | | | | 241/182 |
| 2011/0073694 A1 * | 3/2011 | Timm | ................... | B02C 17/225 |
| | | | | 241/182 |
| 2011/0186670 A1 * | 8/2011 | Town | ..................... | B02C 17/22 |
| | | | | 241/182 |

OTHER PUBLICATIONS

Written Opinion of the International Searching Authority issued by the European Patent Office in relation to PCT/FI2015/050685 dated Jan. 22, 2016 (6 pages).
International Preliminary Report on Patentability issued by the European Patent Office in relation to International Patent Application No. PCT/FI2015/050685 dated Oct. 7, 2016 ( 5 pages).

* cited by examiner

LIFTER BAR, METHOD FOR MAKING A LIFTER BAR, METHOD FOR ASSEMBLING A LIFTER BAR AND A GRINDING MILL

CROSS-REFERENCE TO RELATED APPLICATIONS

This application is a National Phase Entry under 35 USC § 371 of PCT Patent Application Serial No. PCT/FI2015/050685 filed Oct. 12, 2015, which claims priority to Finnish Patent Application No. 20145901, filed Oct. 14, 2014, the disclosure of each of these applications is expressly incorporated herein by reference in their entirety.

FIELD OF THE TECHNOLOGY

The invention relates to a lifter bar. The present invention relates also to a method for making a lifter bar, to a method for assembling a lifter bar and to a grinding mill.

BACKGROUND

Grinding mills are used for processing hard solid material such that large solid material is grinded into smaller pieces. The lifter bars' function is to assist in lifting the solid material that is being processed in the drum as it rotates.

BRIEF DESCRIPTION

The lifter bar, the method for making a lifter bar, the method for assembling the lifter bar and the grinding mill are characterized by what is stated in the independent claims. The preferred embodiments are disclosed in the dependent claims.

The solid material is grinded in a drum shaped shell mounted for rotation about its central axis in the grinding mill. The axis of the rotatable shell is generally horizontally arranged or slightly inclined towards one end in the grinding mill. The interior of the shell forms a treatment chamber and has a cylindrical wall. The inner surface of the chamber is plated with shell plates for protecting the shell because the material to be processed is fed to the treatment chamber and grinding it causes wear in the chamber. The interior wall of the shell is equipped with lifter bars for lifting the material inside the shell along the rotation so that as the shell rotates the lifter bars lift up the solid material along the inside wall of the shell to a point where gravity causes the solid material to fall down inside the shell and by falling down the solid material is crushed. A line of lifter bars extend from one end of the drum to another and they are arranged in a short spacing adjacently along the cylindrical wall of the shell such that there are shell plates arranged between adjacent lifter bars. As compared to the shell plates the lifter bars protrude more from the shell wall than the shell plates.

The lifter bar has a volume which is 30-200 liters, advantageously 50-100 liters. The lifter bar has an outer surface comprising a fixing surface to be arranged against the shell and a wear surface facing toward interior of the grinding mill. The lifter bar comprises a lifter bar body having an outer surface conforming the outer surface of the lifter bar and a fixing element for connecting the lifter bar to the shell of the grinding mill. The fixing element is a mechanical fixing element, for example a lifter channel or holes in the lifter bar such that bolts can be arranged through the holes and through the shell of the grinding mill to fasten the lifter bar to the shell.

The lifter bar body comprises a first portion and a second portion forming a continuous lifter bar body, said first portion comprises the fixing element for connecting the lifter bar to the shell. The fixing element is embedded to the first portion such that it forms part of the fixing surface of the lifter bar. The fixing surface is to be arranged against the shell and the lifter bar is to be secured to the shell through the fixing element in the lifter bar when installed. An example of the fixing element for connecting the lifter bar to the shell is a lifter channel which is connected to the first portion of the lifter bar body and embedded therein such that it forms part of the fixing surface of the lifter bar body. The lifter bars are mechanically fastened to the inner surface of the shell with fastening means such as a bolt connection through the fixing element which is for example a lifter channel. When the lifter bar is installed to the shell of the grinding mill the fixing surface of the lifter bar body is faced against the inner surface of the shell of the grinding mill. The fixing element is typically made of metal and for example of aluminium, but it could be made of any other metal as well, for example steel. The second portion of the lifter bar body is made of polyurethane and forms 35-85% of the volume of the lifter bar.

The polyurethane in the context of this application means polyurethane material that may comprise additives, such as metal particles, ceramics or carbide. The polyurethane material comprises at least 50% and preferably at least 80% pure polyurethane the rest being additives and possible impurities.

The first portion of the lifter bar body may be made of rubber. Alternatively the first portion of the lifter bar body may be made of other polyurethane than the polyurethane in the second portion of the lifter bar body.

The first portion of the lifter bar body may be recycled.

The polyurethane in the second portion of the lifter bar body may be more wear resistant than the polyurethane in the first portion of the lifter bar body. The polyurethane in the second portion and the polyurethane in the first portion may have a difference in wear resistance which is at least 10%, such that the polyurethane in the second portion is more wear resistant than the polyurethane in the first portion.

In the method for making the lifter bar as describe earlier, the method comprises the steps of providing a mould for moulding the lifter bar, adding polyurethane into the mould for forming the second portion of the lifter bar body, which the polyurethane is in such a state that it is arranged to react in the mould an form a connection with a material of the first portion of the lifter bar body and adding other material than the polyurethane of the second portion into the mould for forming the first portion of the lifter bar body. The material of the first portion is in such a state that it is arranged to react in the mould such that the polyurethane in the second portion and the material in the first portion form a connection with each other for forming a continuous lifter bar body.

In one embodiment the method for making the lifter bar may further comprise providing a reinforced wearing plate comprising a wearing surface and an attachment structure for mechanically engaging with the second portion of the lifter bar body. The method may also comprise arranging the reinforced wearing plate in the mould such that the wearing surface forms at least part of the outer surface of the moulded lifter bar.

In one embodiment the method for making the lifter bar further comprises a step of providing a mould comprises providing a mould made of sheet metal having a thickness of less than 10 mm, preferably less than 5 mm and most preferably 0.2-2 mm.

In the method for assembling the lifter bar as described earlier to a shell of a grinding mill, the method comprises the steps of attaching the lifter bar to the shell of the grinding mill by arranging the fixing element against the shell and fastening the lifter bar to the shell with fastening means through the fixing element.

A grinding mill comprising multiple lifter bars as described earlier are arranged to a shell of the grinding mill. The lifter bar is used in grinding mills for ore grinding which the grinding mill's grinding energy per ton of ore is 1-30 kWh/t and preferably 3-20 kWh/t. The diameter of the grinding mill is 1-15 m, and most typically 1.5-10 m. The length of the grinding mill in horizontal direction is between 1 and 15 meter, and most typically from 2 to 8 m. Thickness of the shell of the grinding mill is 0.5-10 cm. This kind of grinding mill is shown in FIGS. 1 and 2. Grinding mills can be for example SAG mills, AG mills, Ball mills, rod mills, scrubbers or regrinds.

In one embodiment the grinding mill may be arranged to grind input material of which at least 80% has particle size between 0.1-300 mm, preferably 1-250 mm and most preferably 80-220 mm to grinded output material of which 80% has particle size between 0.02-3 mm, preferably 0.05-2.5 mm and most preferably 0.2-2 mm.

The grinding mill may further comprise shell plates arranged between adjacent lifter bars.

In one embodiment a lifter bar is provided having a lifter bar body which comprises 35-85% polyurethane of the volume of the lifter bar.

In one embodiment the second portion of the lifter bar comprises polyurethane 40-80% of the volume of the lifter bar.

Lifter bars can be made with moulds made of sheet metal having a thickness of less than 10 mm, preferably less than 5 mm and most preferably 0.2-2 mm.

Effect of a lifter bar comprising 35-85% polyurethane from the total volume of the lifter bar is that there is low energy consumption when manufacturing lifter bars and moulds which are used for manufacturing the lifter bars are lighter. Effect of that the second portion of lifter bar which is PU, covers 35-85% from the total volume of the lifter bar, is that there is low energy consumption when manufacturing lifter bars which fit well between the shell plates, and moulds which are used for manufacturing the lifter bars are lighter.

BRIEF DESCRIPTION OF THE DRAWINGS

In the following the lifter bar will be described in greater detail by means of preferred embodiments with reference to the attached drawings, in which.

DETAILED DESCRIPTION

Figure 1:
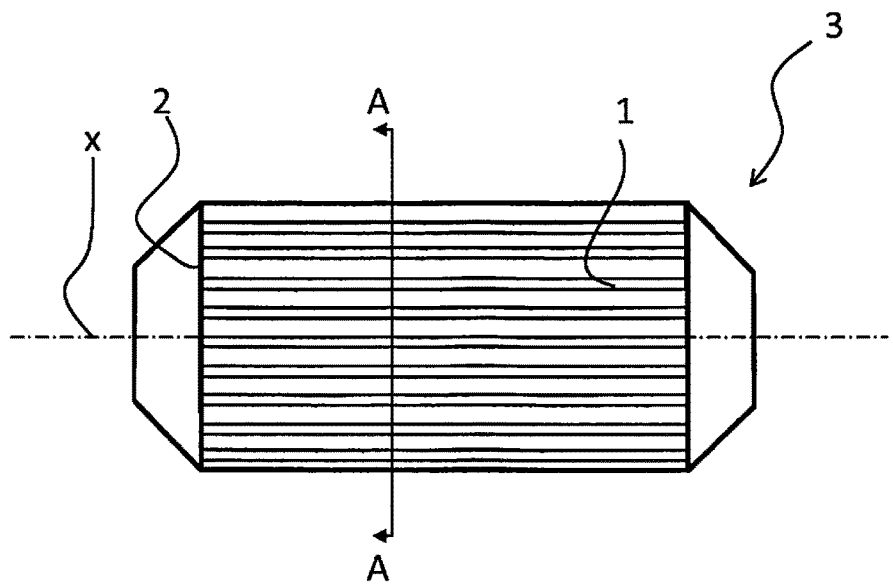
FIG. 1 shows a grinding mill.

FIG. 1 shows, as already described earlier, that the solid material is grinded in a drum shaped shell 2 mounted for rotation about its central axis in the grinding mill 3. The axis of the rotatable shell 2 is generally horizontally arranged or slightly inclined towards one end in the grinding mill 3. The interior of the shell 2 forms a treatment chamber and has a cylindrical wall. The inner surface of the chamber is plated with shell plates for protecting the shell 2 because the material to be processed is fed to the treatment chamber and grinding it causes wear in the chamber. The interior wall of the shell 2 is equipped with lifter bars 1 for lifting the material inside the shell 2 along the rotation so that as the shell 2 rotates the lifter bars 1 lift up the solid material along the inside wall of the shell 2 to a point where gravity causes the solid material to fall down inside the shell 2 and by falling down the solid material is crushed. A line of lifter 1 bars extend from one end of the drum to another and they are arranged in a short spacing adjacently along the cylindrical wall of the shell 2 such that there are shell plates arranged between adjacent lifter bars 1. As compared to the shell plates the lifter bars 1 protrude more from the shell 2 wall than the shell plates.

In other words FIG. 1 shows a longitudinal cross-section of a horizontal grinding mill 3 having an inner shell 2 comprising a cylindrical wall which the shell 2 comprises lifter bars 1 mounted to the cylindrical wall of the shell 2. The grinding mill 3 rotates about its central axis x in a predetermined direction. The axis of the shell 2 is horizontally disposed or slightly inclined toward the other end of the shell 2. The surface of the inner shell 2 is plated with a lining such as shell plates, wear plates or similar elements for protecting the drum against wear caused by grinding. The lining is attached between the lifter bars 1 such that the lifter bars 1 and the lining together protect the surface of the inner shell 2 of the grinding mill 3.

Figure 2:
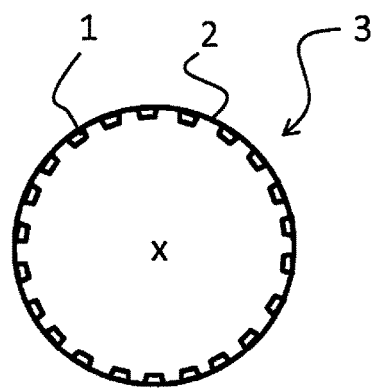
FIG. 2 shows a cross section of the grinding mill in FIG. 1.

FIG. 2 shows a cross-section of the grinding mill 3 shown in FIG. 1 taken along line A-A. The grinding mill 3 rotates in a predetermined direction around its axis indicated by x. The lifter bars 1 are arranged such that they are mounted to the shell 2 of the grinding mill 3 extending in the longitudinal direction of the horizontally arranged grinding mill. The lifter bar 1 comprises a mechanical fixing element, such as channel, a profile or an insert element in the bottom of the lifter bar 1 for mechanically fixing the lifter bar 1 to the shell 2. The lifter bar 1 is secured to the shell 2 of the grinding mill 3 with fasteners such as bolts extending from the shell 2 of the grinding mill 3 to the channel, the profile or the insert element in the bottom of the lifter bar 1 securing the lifter bar 1 to the interior wall of the grinding mill 3.

Figure 3:
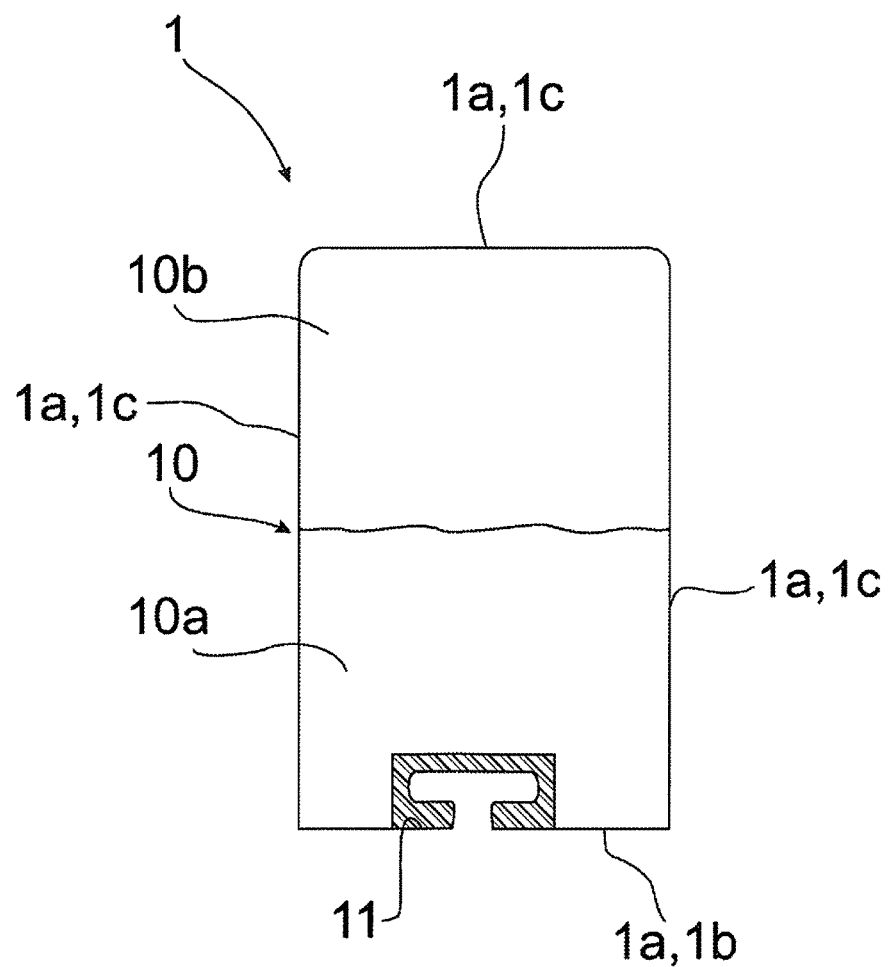
FIG. 3 shows a lifter bar.

FIG. 3 shows one example of a lifter bar 1 as a cross-sectional view. The lifter bar 1 has an outer surface 1a comprising a fixing surface 1b to be arranged against the shell 2 and a wear surface 1c facing toward interior of the grinding mill 3. Part of the wear surface 1c is faced against shell plates arranged next to the lifter bars 1. The lifter bar 1 comprises a lifter bar body 10 and a fixing element 11 for connecting the lifter bar 1 to the shell 2 of the grinding mill 3 (the shell and the grinding mill are not shown in the figure). The lifter bar body 10 further has an outer surface conforming to the outer surface 1a of the lifter bar 1. The lifter bar body 10 further comprises a first portion 10a and a second portion 10b such that the first portion 10a and the second portion 10b form a continuous lifter bar body 10. The first portion 10a comprises the fixing element 11 for connecting the lifter bar 10 to the shell 2. The fixing element 11 is embedded to the first portion 10a such that it forms part of the fixing surface 1b of the lifter bar 1.

The fixing element 11 may be a lifter channel connected and embedded to the lifter bar body 10 in the first portion 10a such that the lifter channel forms part of the fixing surface 1b of the lifter bar 1. Through the lifter channel 11 the lifter bar 1 can be mounted to the inner surface of the shell 2 of the grinding mill 3 together with fastening means.

The lifter bar 1 has length of 0.2-3 m and advantageously 0.5-1.5 m, width of 1 is 50-350 mm and advantageously 100-200 mm and height of 100-500 mm, advantageously 120-300 mm. The volume of the lifter bar 1 is 30-200 liters, preferably 50-100 liters, most preferably 60-90 liters. The second portion of lifter bar which is PU, covers 35-85% from the total volume of the lifter bar. Dimensions in the lifter bar 1 are such that the length defines the reach of the lifter bar 1 when installed to the grinding mill and extending in the longitudinal direction of the horizontally arranged grinding mill, the width defines the reach of the installed lifter bar 1 along the periphery of the shell of the grinding mill and the height defines the reach of the lifter bar 1 from the mounting surface of the lifter bar 1 to the opposing end of the lifter bar 1.

Figure 4:
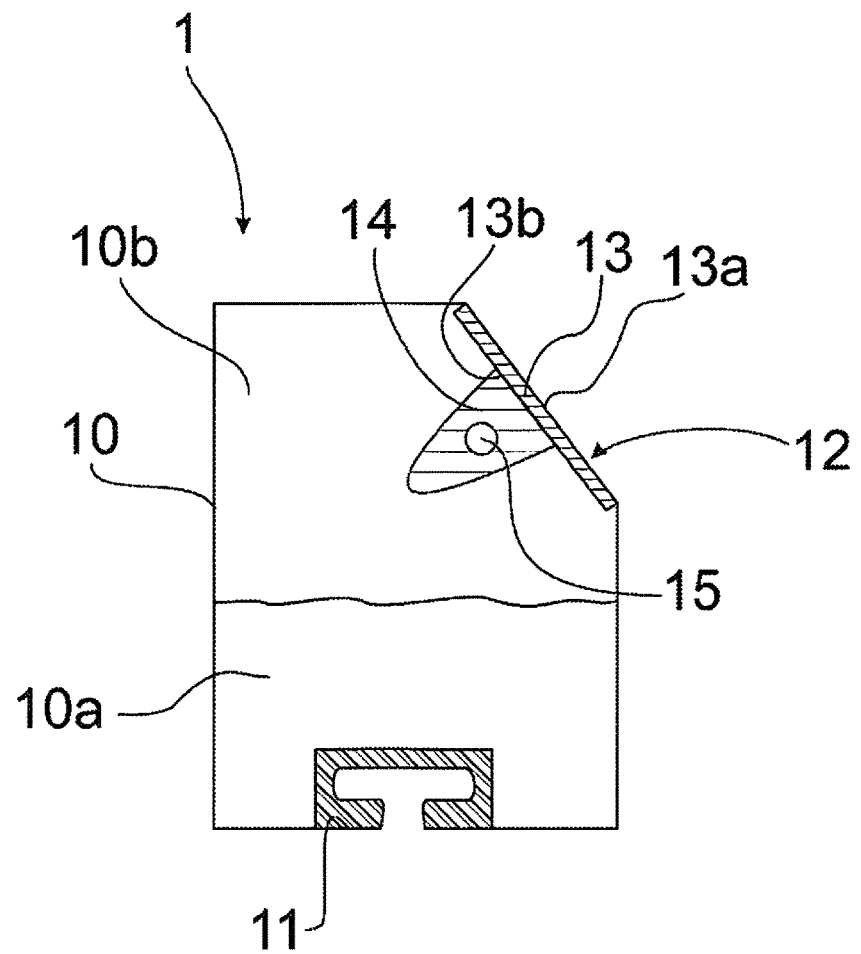
FIG. 4 shows an embodiment according to a lifter bar shown in FIG. 3.

In an embodiment of the lifter bar shown in FIG. 4 the lifter bar further comprises a reinforced wearing plate 12 attached to the lifter bar body 10 in the area of the second portion 10b such that the wearing plate 12 forms part of the outer surface 1a of the lifter bar 1. The reinforced wearing plate 12 comprises a wearing surface 13 for forming part of the outer surface 1a of the lifter bar 1 and an attachment structure 14 provided to the reinforced wearing plate 12 for attaching the reinforced wearing plate 12 to the second portion 10b of the lifter bar body 10. The wearing surface 13 is formed as a flat plate-like structure and the attachment structure is a protrusion from the plate-like wearing surface 13. The wearing surface 13 has an outer surface 13a and an inner surface 13b. The outer surface 13a of the wearing surface 13 forms part of the outer surface of the lifter bar 1 together with the outer surface of the lifter bar body 10. The attachment structure 14 is attached to the inner surface 13b of the wearing surface 13 and protrudes from the inner surface 13b of the wearing surface 13 into the lifter bar body 10. The length of the attachment structure 14 is at least ⅓ of the width of the lifter bar 1 and said attachment structure is arranged to protrude into the lifter bar body 10 forming a tight connection with the lifter bar body.

In one embodiment the lifter bar 1 comprises a reinforced wearing plate 12 attached to the lifter bar body 10 in the second portion 10b. The reinforced wearing plate 12 comprises metal, said reinforced wearing plate 12 further comprises a wearing surface 13 for forming a part of the outer surface of the lifter bar 1 in a distal end of the second portion 10b or in the vicinity of the second portion 10b. An attachment structure 14 is provided to the reinforced wearing plate 12 for attaching the reinforced wearing plate 12 to the lifter bar body 10, said attachment structure 14 protruding into the second portion 10b of the lifter bar body 10 for forming a connection with polyurethane.

The attachment structure 14 engages mechanically with the lifter bar body 10 and therefore a preferable shape of the attachment structure 14 is annular or round arch like a clamp or a fixing ring comprising a hole 15 arranged to extend through the attachment structure 14. The through hole 15 in the attachment structure 14 is arranged in a direction same as the longitudinal direction of the lifter bar 1 when the reinforced wearing plate is connected to the lifter bar body 10 for achieving more durable connection with the lifter bar body 10. The attachment structure 14 has a width in the direction of the through hole 0.3-5 cm. In other words the attachment structure is made of a material having thickness of 0.3-5 cm. A plurality of attachment structures 14 are associated with the wearing surface 13 such that the attachment structures 14 are distributed along the length of the wearing surface 13. Both the wearing surface 13 and the attachment structure 14 are made of metal but they may be made of different metal. The wearing surface 13 is preferably made of weldable wear-resistant metal.

In one embodiment the attachment structure 14 is arranged to protrude inside the lifter bar body 10 such that the attachment structure 14 is throughout embedded in the lifter bar body 10.

It will be obvious to a person skilled in the art that, as the technology advances, the inventive concept can be implemented in various ways. The invention and its embodiments are not limited to the examples described above but may vary within the scope of the claims.

The invention claimed is:

1. A lifter bar configured to be mountable to a shell of a grinding mill for ore grinding, comprising:
   an outer surface comprising a fixing surface to be arranged against the shell of the grinding mill;
   a wear surface facing toward an interior portion of the grinding mill;
   a lifter bar body having an outer surface conforming to the outer surface of the lifter bar; and
   a fixing element for connecting the lifter bar to the shell of the grinding mill, the lifter bar body further comprising a first portion and a second portion forming a continuous lifter bar body, wherein the fixing element is embedded in the first portion such that the fixing element forms a part of the fixing surface of the lifter bar, wherein the first portion of the lifter bar body is made of rubber, wherein the second portion is made of polyurethane and forms 35-85% of a volume of the lifter bar.

2. The lifter bar according to claim 1, wherein the first portion of the lifter bar body is recyclable.

3. The lifter bar according to claim 1, wherein the second portion-is formed of polyurethane and forms 40-80% of the volume of the lifter bar.

4. The lifter bar according to claim 1, wherein the lifter bar further comprises:
   a reinforced wearing plate attached to the second portion of the lifter bar body, the reinforced wearing plate comprising metal, wherein the reinforced wearing plate further comprises a wearing surface for forming a part of the outer surface of the lifter bar in a distal end of the second portion or in the vicinity of the second portion; and
   an attachment structure disposed on the reinforced wearing plate for attaching the reinforced wearing plate to the lifter bar body, the attachment structure protruding into the second portion of the lifter bar body for forming a connection with polyurethane.

5. The lifter bar according to claim 1, wherein the fixing element is a mechanical fixing element.

6. The lifter bar according to claim 1, wherein the fixing element is a lifter channel.

7. A grinding mill for ore grinding comprising multiple lifter bars arranged on a shell of the grinding mill, wherein the multiple lifter bars of the grinding mill are according to claim 1.

8. The grinding mill according to claim 7, wherein the grinding mill is configured to output an energy per ton of ore of 1-30 kWh/t.

9. The grinding mill according to claim 7, wherein the grinding mill defines a circular profile having a diameter of 1-15 m.

10. The grinding mill according to claim 7, wherein the grinding mill has a length of 1-15 m in a horizontal direction.

11. The grinding mill according to claim 7, wherein the shell of the grinding mill has a thickness of 0.5-10 cm.

12. The grinding mill according to claim 7, wherein the grinding mill is configured to grind an input material of which at least 80% has a particle size that is between 0.1-300 mm to a grinded output material of which 80% has a particle size that is between 0.02-3 mm.

13. The grinding mill according to claim 12, wherein the grinding mill is configured to grind an input material of which at least 80% has a particle size that is between 1-250 mm.

14. The grinding mill according to claim 12, wherein the grinding mill is configured to grind an input material of which at least 80% has a particle size that is between 80-220 mm.

15. The grinding mill according to claim 12, wherein the grinding mill is configured to grind an input material of which at least 80% has a particle size that is between 0.1-300 mm to a grinded output material of which at least 80% has a particle size that is between 0.05-2.5 mm.

16. The grinding mill according to claim 12, wherein the grinding mill is configured to grind an input material of which at least 80% has a particle size that is between 0.1-300 mm to a grinded output material of which at least 80% has a particle size that is between 0.2-2 mm.

17. The grinding mill according to claim 7, wherein the grinding mill further comprises shell plates arranged between adjacent lifter bars.

18. The grinding mill according to claim 7, wherein the grinding mill is configured to output a grinding energy per ton of ore of 3-20 kWh/t.

19. The grinding mill according to claim 7, wherein the grinding mill defines a circular profile having a diameter of 1.5-10 m.

20. The grinding mill according to claim 7, wherein the grinding mill has a length of 2-8 m.

* * * * *